United States Patent [19]

Attinger et al.

[11] 4,221,850
[45] Sep. 9, 1980

[54] STORAGE BATTERY WITH THERMOPLASTIC CASING HAVING INTERNAL MEMBERS FOR IMMOBILIZING THE BATTERY PLATES

[75] Inventors: Manfred Attinger, Hildesheim; Gert Niemann, Nordstemmen; Lothar Makkens, Sachsenheim; Werner Eisenacher, Nordstemmen; Fritz Frauböse, Hildesheim, all of Fed. Rep. of Germany

[73] Assignee: Robert Bosch GmbH, Stuttgart, Fed. Rep. of Germany

[21] Appl. No.: 740,380

[22] Filed: Nov. 10, 1976

[30] Foreign Application Priority Data

Dec. 6, 1975 [DE] Fed. Rep. of Germany ....... 2555009
Jul. 17, 1976 [DE] Fed. Rep. of Germany ....... 2632308

[51] Int. Cl.³ .............................................. H01M 2/02
[52] U.S. Cl. ...................................... 429/160; 429/186
[58] Field of Search ........................ 429/186, 175, 160

[56] References Cited

U.S. PATENT DOCUMENTS

| | | | |
|---|---|---|---|
| 1,368,817 | 2/1921 | Marko | 429/175 |
| 1,983,611 | 12/1934 | Jackson | 429/186 |
| 3,443,995 | 5/1969 | Halsall et al. | 429/186 |
| 3,977,907 | 8/1976 | Roth et al. | 429/175 |
| 3,996,065 | 12/1976 | Trippe et al. | 429/186 |

FOREIGN PATENT DOCUMENTS

| | | | |
|---|---|---|---|
| 25264 | of 1908 | United Kingdom | 429/186 |
| 243239 | 11/1925 | United Kingdom | 429/186 |
| 709254 | 5/1954 | United Kingdom | 429/186 |

Primary Examiner—Donald L. Walton
Attorney, Agent, or Firm—Frishauf, Holtz, Goodman & Woodward

[57] ABSTRACT

Downwardly extending members are molded on the inside of a synthetic resin battery case cover and bear against the bridging members of battery plate assemblies or upward bulges of the battery plates to hold the latter vertically in place. The downwardly extending thermoplastic members may be heat-softened at their ends at the time the cover is fused onto the rest of the battery case, or they may be made so that they will flex at that time or they may be made of two members that will telescope together against strong pressure, so that they will still bear against the electrode plates after the cover has been fused onto the rest of the casing.

7 Claims, 6 Drawing Figures

STORAGE BATTERY WITH THERMOPLASTIC CASING HAVING INTERNAL MEMBERS FOR IMMOBILIZING THE BATTERY PLATES

This invention relates to a lead-acid storage battery of which the casing and cover are made of thermoplastic synthetic resin and the cover is fused onto the casing after the battery plate blocks have been inserted in the cell cavities of the casing.

In the case of lead-acid storage batteries provided for motor vehicles, the problem arises that as the result of the strong shaking movements active materials are shaken off the structure of the electrodes if the battery plate assemblies provided in the storage battery are not held firmly in place. Arrangements for holding the plate blocks in the battery cases have, therefore, been used for a long time. Some manufacturers of vehicle batteries utilize so-called auxiliary separators, one or more of which are inserted between the battery plate assembly and the casing wall, the number depending upon the manufacturing tolerances of the casing and of the plate blocks. Other vehicle battery manufacturers utilize wedges that are made to adhere to the casing or to the plate blocks. All the described methods are expensive and unreliable and little suited for automatic assembly and manufacture of storage batteries.

After displacement of hard rubber, or the only slightly elastic synthetic materials such as polystyrene, as battery casing materials by elastic synthetic materials such as polypropylene, still greater difficulties have resulted with regard to the firm holding of the plate blocks in place, because the walls of the battery casings made of elastic materials are deformable and are more easily spread out from their normal position. A notable improvement of the firmness against shaking forces in battery cases, of course, was produced by the effect of stiff or elastic ribs acting laterally against the battery plate block surfaces. In spite of all such measures, however, there has been only an unsatisfactory provision for shakeproof holding of the plate blocks in position and hence for prevention of loss of active material by the plates.

It is an object of the present invention to provide, in a storage battery in which the plate blocks have been laterally held in position by ribs or the like, a secure and inexpensive arrangement for completely holding them in position against shaking forces, and to accomplish this in a battery of which the casing and cover are made of synthetic resin material.

SUMMARY OF THE INVENTION

Downwardly extending members are provided on the inside of the cover, which is to say on the side of the cover facing the cell cavities of the battery case, having, in a first embodiment of the invention, forked ends spreading on both sides of the profile of an upward bulge of the electrode plate contour, thus bearing against the respective plate blocks.

In another embodiment the downwardly extending members are tubular extensions surrounding a battery terminal stud. A plug member with a bearing surface pad at the bottom is adjustably fitted into each tubular member with the adjustment being possible only under application of relatively high pressure. The bearing surface of the plug member may be made to bear either upon a pole bridge or upon upwardly bulging portions of electrode plates of a plate block. It is also possible to equip the downwardly extending members of the cover with a connection to a springy element that is inserted between the end plate of a plate block and the adjacent battery casing wall, so that by this combination the plate block is firmly positioned both vertically and laterally.

The invention is further described by way of example with reference to the accompanying drawings, in which.

Figure 5:
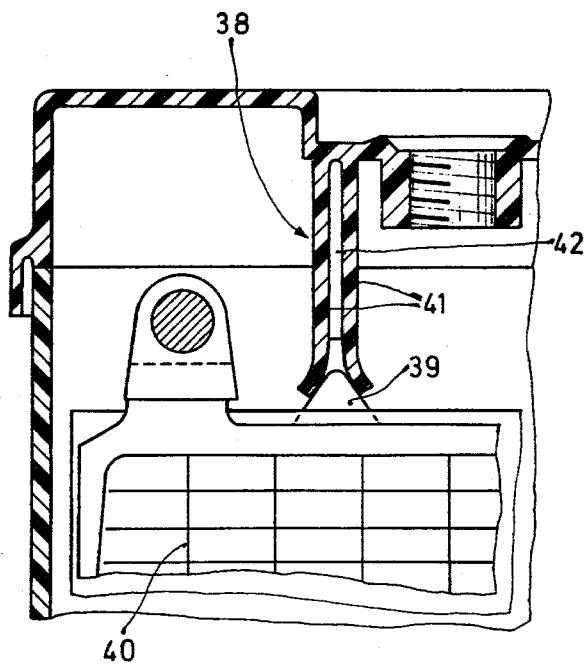
Figure 6:
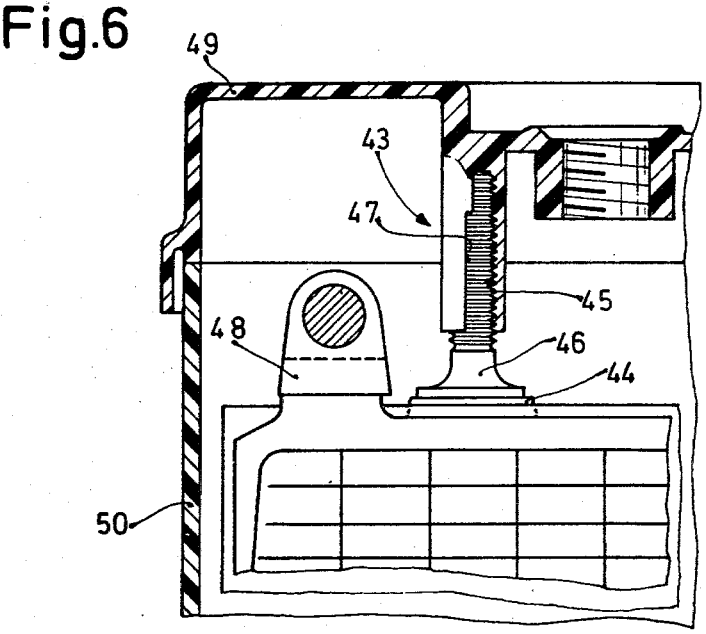

FIG. 5 is a section through the upper portion of a battery in which downwardly extending members of the cover, according to the first embodiment of the invention, have their lower ends in the form of elastic forking ends bearing against upwardly bulging portions of electrode plates, and FIG. 6 is a section through an upper portion of a battery in which the downwardly extending members of the cover, in accordance with a second embodiment of the invention, are composite and have an adjustable plate member that bears against upwardly bulging portions of the electrode plates of a plate block.

Figure 1:
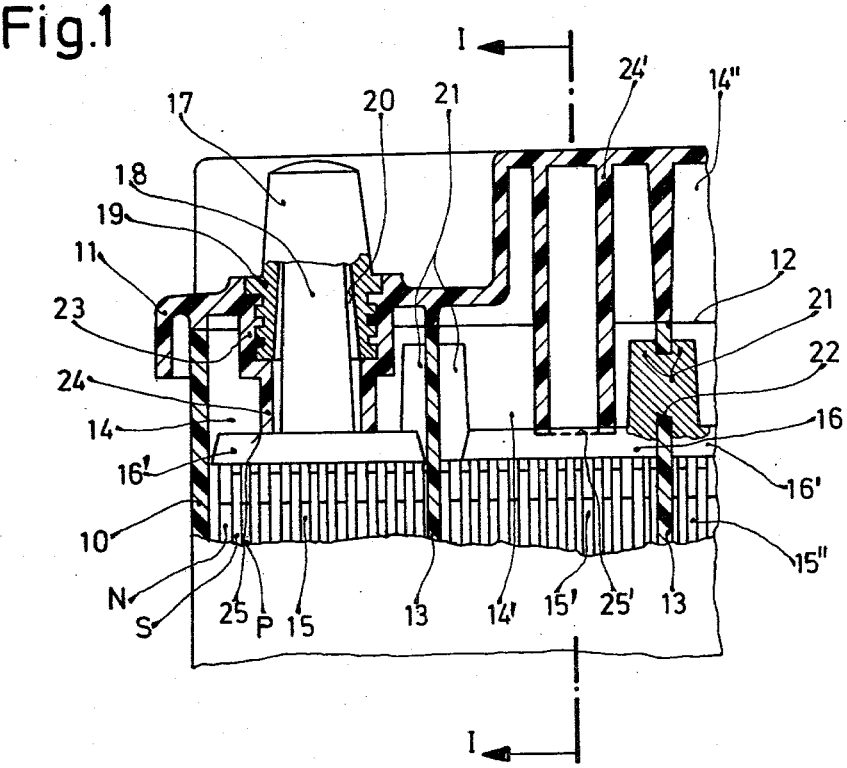
FIG. 1 shows, mostly in section, a portion of a battery case and cover structure bearing on the upper portion of electrode plate blocks, the downwardly extending portions being of the tubular type bearing against pole bridges.
Figure 2:
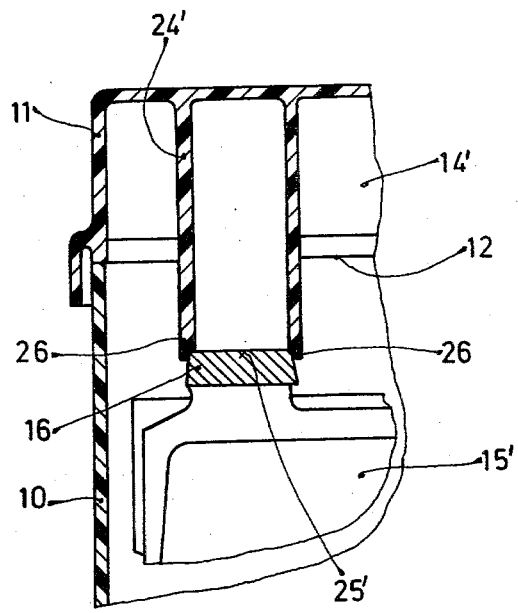
FIG. 2 is a section along the line I—I of FIG. 1.

The storage battery shown in partial section in FIGS. 1 and 2 comprises a cast casing 10 and a cast cover 11 which are both made of thermoplastic material such as polypropylene and are connected together by the well-known heat fusion process that forms a fusion seam 12 where the tube bodies are joined. The casing 10 and the cover 11, with the cooperation of the partition walls 13, provide the cell chambers 14,14' and 14" in each of which is located an electrode plate block 15,15',15". Each of these plate blocks is, as is well known, composed of negative electrode plates N and positive electrode plates P separated by separators S. These plate blocks 15,15',15" can be laterally held in position by rigid and/or flexible ribs not further shown in the drawing that are provided on the inner surface of the casing 10. The positive electrode plates P of each plate block 15,15',15" are connected in parallel to each other by a pole bridge 16 and, likewise, the negative electrode plates N of each plate block 15,15',15" are connected together by means of a pole bridge 16'. The pole bridges 16,16' that are connected to a connection terminal 17 have a pole stud 18 and these pole studs 18 extend upwards through a cover bore 20 equipped with a lead bushing 19 and are soldered or welded to the lead bushing 19 at their free ends. The other pole bridges 16,16', namely those which do not have terminals for external connections, have legs 21 going along side the separator walls 13 and two of these in each case form connections between cells through holes 22 in the cell separating walls. In the drawings no attempt has been made to show the electrolyte liquid of the storage battery in which the battery plates are immersed.

The portion of the cast cover 11 that surrounds the lead bushing 19 is designated by the reference numeral 23. Integral with it is an extension 24 provided according to the present invention extending into the cell chamber 14, with its end surface 25 bearing against the pole bridge 16'. This downward extension 24 surrounds in tubular fashion the pole stud 18 and, in cooperation with the ribs on the inside of the battery casing 10, which are not shown in the drawing but are well known and may be either rigid or flexible, assures a shakeproof positioning of the plate block 15.

In FIGS. 1 and 2, there are also shown downward extensions 24' which are formed integrally with the cover 11 and bear against the pole bridges 16 and 16' that have offset legs 21 for intercell connections. These downwardly extending members 24' have in this illustrated case the form of stub tubes of oval or elongated circular cross-section. The ends 25' of these tubular members 24' have projections 26 that extend along both sides of the pole bridge 16 and provide a further arresting of the plate block 15 (against movement). The firm bearing of the extending members 24 and 24' and the very production of the projections 26 can be facilitated if at the same time that the fusion joint of the cover and casing is prepared by melting the surfaces of the corresponding portions of the casing 10 and of the cover 11 to produce the fusion seam 12, the end surfaces 25 and 25' are softened by the same processing, so that when the cover 11 and the casing 10 are put together, the ends of the downward projections of the cover are deformed by meeting the pole bridges 16 and 16' and form the corresponding side-engaging surfaces.

Figure 3:
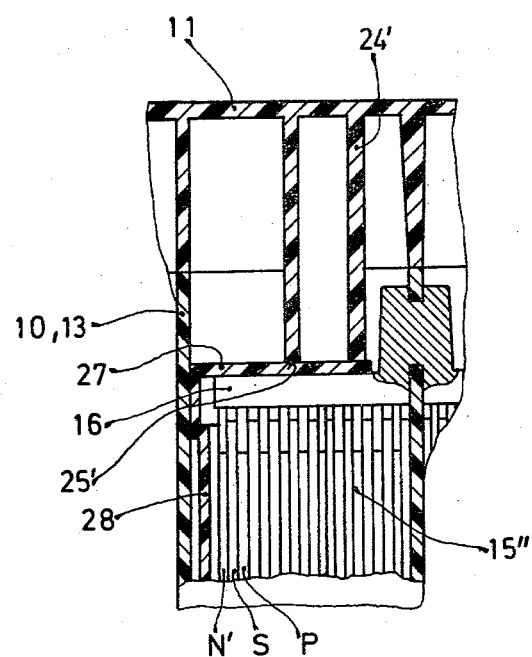
FIG. 3 is a section of a portion of a battery showing a downwardly extending portion from the cover of the kind that is provided with a springy element for lateral positioning of the plate block extending between the plate block and the adjacent wall of the casing.

FIG. 3 shows a further development of the embodiments illustrated in FIGS. 1 and 2. The downwardly extending member 24' of the cover 11 bears on the pole bridge 16 only through a cross member 27 which is a bent over portion of a springy insertion element 28, likewise made of thermoplastic synthetic resin, which is inserted between the end electrode plate N' of the plate block 15'' and the adjacent wall 15 of the casing 10. The downwardly extending member 24' has its end surface 25' heat bonded to the cross member 27 and this thermal bonding step is carried out at the same time with the well-known fusion joining of the cast resin cover 11 and the cast resin casing 10. Instead of the provision of a springy element 28 at only one side of the plate block 15'', such elements 28 could also be inserted on both sides of the plate block 15'''; the downward extension 24' made integral with the cover would then have to be joined to a bent-over end 27 of each of the elements 28 in that case. Insertion elements 28 of a springy or elastic character are described, for example, in German Utility Model No. 7 331 852.

Figure 4:
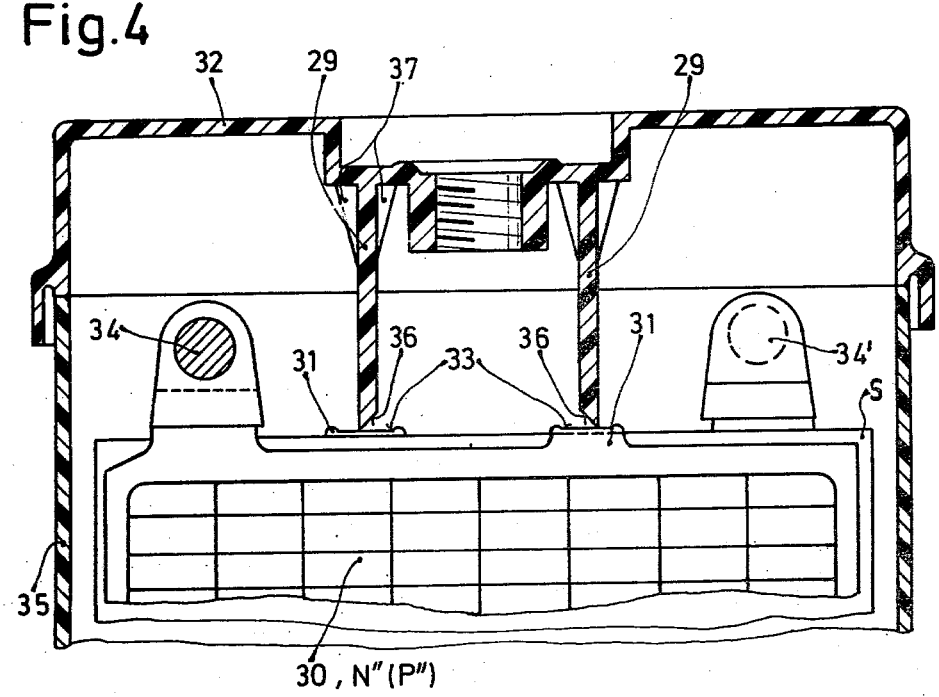
FIG. 4 is a section through the upper part of a storage battery in which the downwardly extending members of the cover are in the form of partition walls and bear against upwardly bulging portions of the electrode plates.

FIG. 4 shows downwardly extending members 29 of a battery casing cover 32 which bear upon a different portion of a plate block 30, in this case upwardly bulging portions 31 of the electrode plates N'' or P'', which are provided in the design of the plates and bulge upwardly at least to the height of the upper boundary of the separators S, which are provided between the electrode plate N'' and P'' respectively. These upwardly bulging portions 31 of the electrode plates have one or more transverse grooves or corners, in the illustrated case a groove or corner formed by a transverse border lip, that serve the purpose of preventing the downwardly extending members 29 from slipping off the bulging portions 31. The downwardly extending members 29 in this case have the shape of a downwardly extending partition wall which is directed perpendicularly to the plates of the plate block 30. It is desirable in this case for the bulging portions 31 to be as far as possible from the corresponding intercell connection 34 or 34' provided for the electrodes N'' or P'', as the case may be. The end surfaces 36 of the downwardly extending wall-like members 29 are oblique over their length for equalization of the effects of the manufacturing tolerances of the case cover 32, the battery casing 35 and the plate block 30, so that when the fusion joining of the casing 35 and the cover 32 takes place, the downwardly extending wall members 29 will bow out readily. Instead of these oblique end surfaces 36 (or in addition to provision of the oblique end surfaces), the free end portions of the members 29 can be heated at the same time as the fusion of the casing 35 and the cover 32 takes place, so that they can fit closely to the height of the electrode plate bulges 31. The downwardly extending members 29 in the illustrated case are based by corner webs 37 molded at the same time as the cover 32 and the members 29.

FIG. 5 shows a form of downwardly extending members 38 of a battery cover according to a first embodiment of the invention bearing against upward bulges 39 of the contour of the electrode plates. FIG. 5 shows the profile of a downwardly extending member 38 running perpendicular to the plates of the plate block 40 and consisting of two walls 21 spaced from each other that are connected together by a few cross walls 42 formed at the same time as the walls 41. The cross walls 42 do not reach to the lower end of the bodies 38, so that the free end portions of these downwardly extending members 38 can operate as a forked member, the legs of which are spread out upon engagement with the bulging portions 39 of the electrode plates.

FIG. 6 shows a second embodiment of the invention in which the portion 43 of the downwardly extending member which is cast integrally with the cover 49 is more or less tubular and has an axial bore 45 into which a plug member 46 with a bottom pad surface is engaged. The plug member can be shifted axially in the bore 45 only with relatively high pressure. For this purpose, small transverse serrations only roughly indicated on the drawing may be provided. A longitudinal slot 47, or two or more of them, are provided that is or are open to the end of the tubular member 43, allowing spreading of the tubular member with insertion of the plug. It should be mentioned that instead of the slot 47 and/or the serrations of the tubular member 43 and the plug 46, a slight taper of the bore end and of the plug 46 can be used. A hold-down device for the battery plate stacks thus made of a plug member 46 fitting into a member 43 cast integrally with the battery cover can be used not only, as illustrated in FIG. 6, to bear against upwardly bulging portions 44 of the electrode plates, but also against a connecting bridge or device 48 for the battery plates. The adjustment of the level at which the plug 46 bears against the particular feature of the battery plate block is determined at the same time that the cover 49 and the casing 50 are fused together, the pressure applied between cover and casing being at that time sufficient to force the plug into the bore 45 without unduly releasing the pressure with which the plug bears against the battery plate block.

Although the invention has been described with reference to certain illustrative examples, variations are possible within the inventive concept.

We claim:

1. A multi-cell lead-acid storage battery having a case (35) and a one-piece cover (32) both made of a thermoplastic synthetic resin, said cover being fastened to said case by a fusion joint, said case being subdivided by partitions integral therewith into cell containers (14,14',14", ...) each containing a battery plate block (15,15',15",30,40) constituted by an assembly of electrode plates and plate separators equipped with pole bridges (16,16') respectively connecting together the plates of the same polarity of a cell, the pole bridges of the several cells being further interconnected to constitute a battery electrically, and terminals being provided for external connection, wherein, for improvement of the battery:

at least one downwardly extending member (38,41) of said cover is of a cross-section providing forked extremities, said forked extremities embracing and bearing against bulging portions (39) of one or more of said electrode plates and being deformed thereby, for restriction of movement of said plate block in said casing, said bulging portions (39) of said plates being provided on electrode plate edges which are the nearest to said cover (32) of the edges of one or more of said electrode plates (N",P") and extending towards said cover to a height at least equal to that of the adjacent aforesaid separators (S).

2. A lead-acid storage battery having a case (10,35,50) and a one-piece cover (11,32,49) both made of a thermoplastic synthetic resin, said case being subdivided by partitions integral therewith into cell containers (14,14',14", ...) each containing a battery plate block (15,15', 15",30,40) constituted by an assembly of electrode plates and plate separators equipped with pole bridges (16,16') respectively connecting together the plates of the same polarity of a cell, the pole bridges of the several cells being further interconnected to constitute a battery electrically, and terminals being provided for external connection, wherein, for improvement of the battery:

said cover has downwardly extending portions (43) on the side of said cover which faces the cell containers, at least one of said downwardly extending portions having its end surface or surfaces located so as to bear against each of said plate blocks, each of said downwardly extending portions of said cover including a tubular member (43) integral with said cover and a plug member (46) engaged in the inside of said tubular member and adjustable therein only by application of strong pressure, said plug member having an end portion of relatively larger lateral dimensions bearing on an upwardly prominent portion of the respective plate block, thereby restricting movement of said plate block in said casing.

3. A lead-acid battery as defined in claim 2, in which said tubular member of said downwardly extending members and said plug members thereof are slightly tapered so as to provide a snug tapered fit.

4. A lead-acid battery as defined in claim 3, in which said tubular member integral with said cover has at least one longitudinal slot (47).

5. A lead-acid battery as defined in claim 2, in which the inside of said tubular member and the surface of said plug member fitting into said pivoted member are provided with transverse serrations.

6. A lead-acid battery as defined in claim 5, in which said tubular member integral with said cover has at least one longitudinal slot (47).

7. A lead-acid battery as defined in claim 2, in which said tubular member integral with said cover has at least one longitudinal slot (47).

* * * * *